United States Patent [19]

Seifert et al.

[11] Patent Number: 4,722,793
[45] Date of Patent: Feb. 2, 1988

[54] APPARATUS AND METHOD FOR THICKENING PULP AND PAPER STOCK

[75] Inventors: Peter Seifert, Middletown; Michael F. Kinne, Trenton; Larry D. Markham, Middletown, all of Ohio

[73] Assignee: The Black Clawson Company, Middletown, Ohio

[21] Appl. No.: 29,301

[22] Filed: Mar. 23, 1987

Related U.S. Application Data

[63] Continuation-in-part of Ser. No. 882,041, Jul. 3, 1986, abandoned.

[51] Int. Cl.⁴ .................. B01D 33/04; B01D 25/32
[52] U.S. Cl. ............................ 210/401; 210/407; 209/307; 162/55
[58] Field of Search ............ 210/401, 407; 209/307, 209/308, 384; 162/55, 60, 306, 316, 317

[56] References Cited

U.S. PATENT DOCUMENTS 4,501,662  2/1985  Biondetti .................. 162/55 X

Primary Examiner—Peter Chin
Assistant Examiner—Thi Dang
Attorney, Agent, or Firm—Biebel, French & Nauman

[57] ABSTRACT

Apparatus for thickening a suspension of pulp material employs a single pair of liquid-impervious rolls and a single loop of wire trained around both rolls which are spaced from each other in substantially the same horizontal plane. The pulp stock to be thickened is delivered into the wedge zone defined by the upper wire run approaching the top of one roll and the surface of that roll, so that the pulp is trapped between the wire and roll as it travels around the roll with the wire, and the rolls are driven at sufficient speed to develop centrifugal forces which cause liquid to be expressed through the wire from the pulp trapped against the roll. The resulting partially dewatered pulp is redeposited from the first roll onto the lower wire run for travel to the other roll, where it is similarly subjected to centrifugal force for further expression of liquid through the wire, after which the pulp is removed from the surface of the second roll in the wedge zone defined by the surface of that roll and the wire run travelling therefrom to the first roll.

20 Claims, 5 Drawing Figures

APPARATUS AND METHOD FOR THICKENING PULP AND PAPER STOCK

This application is a continuation-in-part of the application of Peter Seifert and Michael J. Kinne, Ser. No. 882,041, filed July 3, 1986 now abandoned and co-owned with the present application.

BACKGROUND OF THE INVENTION

The pulp and paper making industry has for many years made regular use of apparatus for thickening pulp and paper stock, usually for storage or other temporary treatment purposes. The apparatus most commonly used is known as a decker, and is relatively closely comparable in structure and mode of operation with a cylinder type paper machine, in that its main components are a wire-covered cylinder mold and a vat in which the cylinder mold rotates. In operation, the thickened pulp collects on the outer surface of the mold and is then dumped or couched therefrom for transport to a storage tank or other next station.

Deckers occupy considerable floor space, and are also relatively expensive, since the cylinder mold is a fairly complex piece of machinery, including as it does a structural framework for the filter wire. In addition, a decker is necessarily slow in operation, partly because the rotational speed of the cylinder mold must be kept below values at which centrifugal force would tend to cause the thickened pulp to be thrown off its surface, and the surface speed of cylinder molds is commonly in the range of only 200–250 ft./min.

SUMMARY OF THE INVENTION

The present invention provides apparatus for thickening pulp and paper stock which is of entirely different construction from a decker. Instead of a cylinder mold, in the simplest form of the invention, it employs a single pair of smooth-surfaced rolls and a single wire trained around those rolls so that it wraps substantially 180° of the surface of each roll. The pulp stock to be thickened is initially delivered to the inside of the wire run approaching the top of one roll so that the pulp is trapped in the wedge zone between the wire and the roll and caused to travel around the roll with the wire at sufficient rotational speed that centrifugal force causes liquid to be expressed through the wire from the pulp trapped between the wire and the roll.

The resulting partially dewatered pulp then travels on the lower wire run to the other roll, where it is similarly subjected to centrifugal force causing further expression of liquid through the wire. After thus traveling around the surfaces of both rolls, the pulp is removed from the surface of the second roll in the wedge zone defined by the roll surface and the wire run traveling therefrom to the first roll.

A special feature of the invention takes advantage of the fact that paper pulp always tends to stick to the smoother of two surfaces with which it is brought into contact, which means that as the wire leaves the surface of the first roll, the pulp will tend to transfer from the inner surface of the wire to the roll. In accordance with the invention, a doctor is provided in wedge zone defined by the departing wire run and the roll surface which will remove the partially thickened pulp from the roll and redeposit it on the inner surface of the wire, accompanied by some mixing action. This partially thickened and redeposited pulp then travels on the wire to the second roll, and its mixed condition promotes more effective dewatering as it travels around the second roll.

An important aspect of the invention was derived from observation of the fact that in operation, the liquid initially discharged through the wire, over the first 90° or less of travel of the trapped pulp about the axis of the first roll, has a relatively high concentration of fines which would have substantial value if they were retained in the thickened pulp. This fact is taken advantage of, and the fines are recovered, by segregating that portion of the liquid which is first discharged through the wire, and recirculating that segregated liquid, with its high fines content, back to the space enclosed within the wire loop and discharging it on top of the layer of pulp traveling on the lower run of the wire from the first roll to the second roll. While this will necessarily nullify some of the dewatering action which took place at the first roll, this is more than compensated for by the quantity of fines which can be recovered thereby.

In a further alternative modification of the invention, additional dilute pulp may be delivered to the interior of the wire loop in the wedge zone defined by the second roll and the lower run of the wire approaching its surface. Since this second delivery of pulp is made on top of the thickened mat of pulp traveling on the wire, it will be less subject to loss of fines than at the first roll, because that pulp mat will act as a filtering medium which retains a high proportion of these fines. In a further application of this feature of the invention, the supplying of additional pulp to the lower run of the wire can be in conjunction with or in addition to the supply of white water recirculated from the first roll as described above.

A further feature of the invention lies in the surface characteristics of the rolls around which the wire loop travels. While the invention is operative with smooth-surfaced rolls, preferred results have been obtained if the surface of one or both of the rolls is grooved or otherwise provided with blind indentations, i.e. which are limited to the surface of the roll and do not transmit liquid therethrough or otherwise reduce the liquid-impervious characteristics of the roll. Test results indicate that with rolls of such surface characteristics, there is increased space inside the portion of the wire wrapping each roll wherein fiber can be received and held. Further, due to the effects of centrifugal force, these surface indentations do not retain liquid, but they do increase the capacity of the apparatus for pulp per given unit of time.

Other features and advantages of the invention will be apparent from the detailed description hereinafter of the preferred embodiments shown in the drawings.

DETAILED DESCRIPTION OF THE PREFERRED EMBODIMENTS

Figure 1:
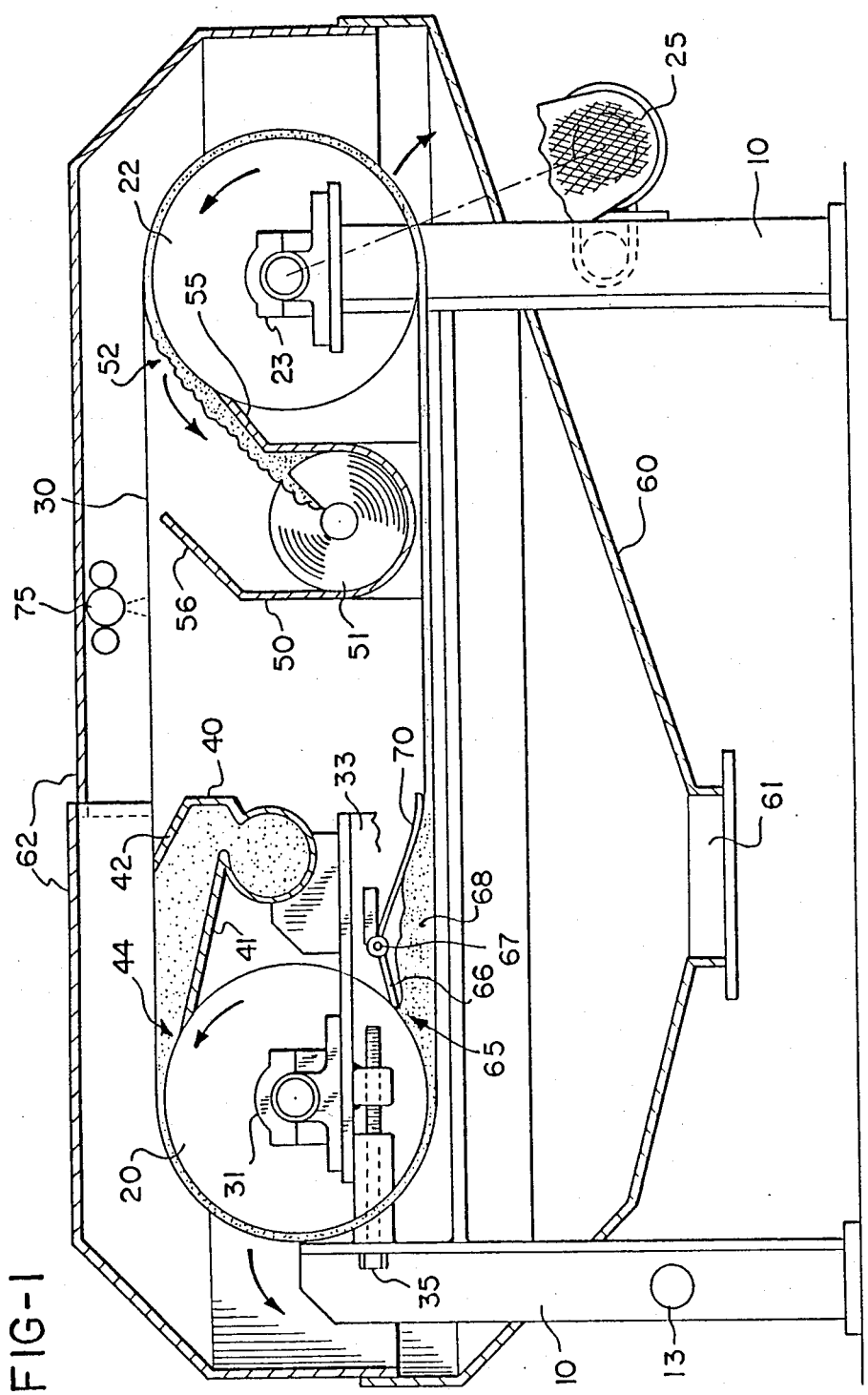
FIG. 1 is a somewhat diagrammatic side view, partly in section, of thickening apparatus in accordance with the invention.
Figure 2:
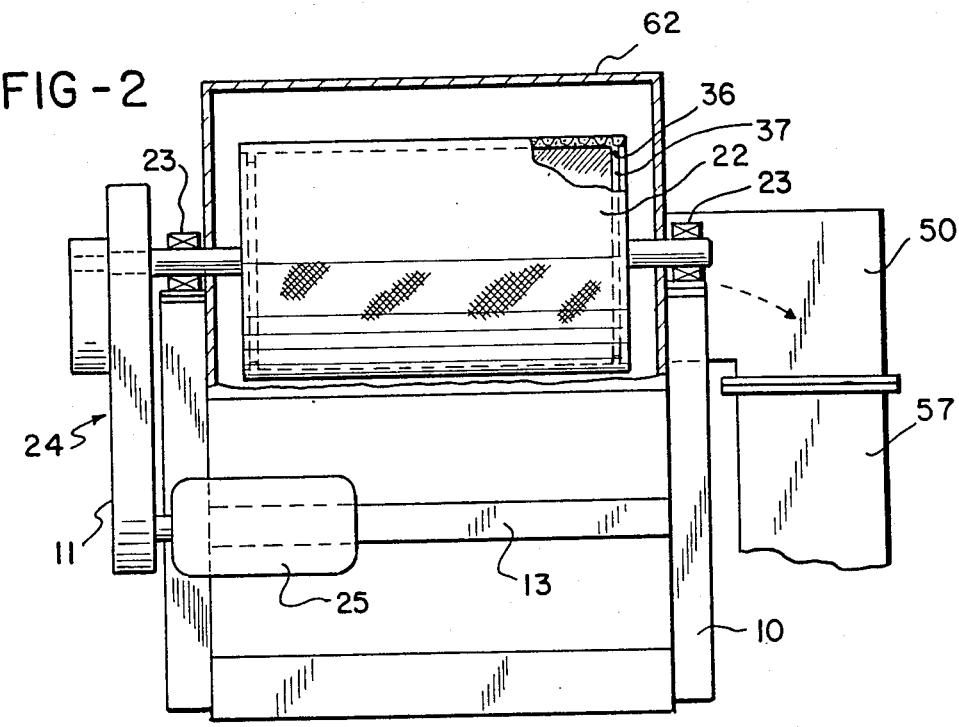
FIG. 2 is an end view looking from right to left in FIG. 1 partly in section.
Figure 3:
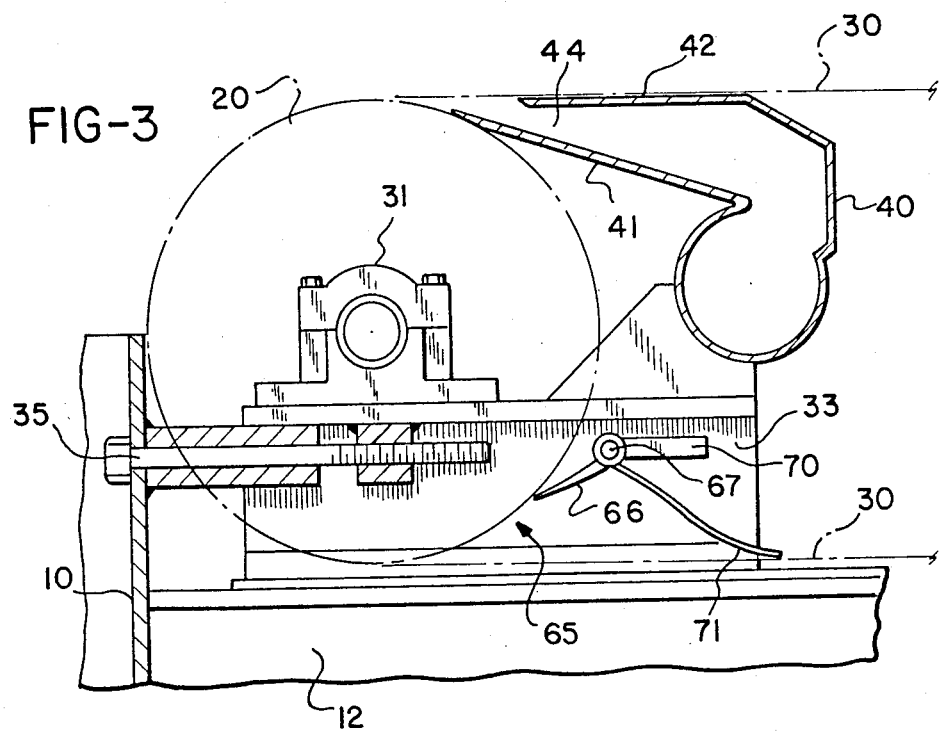
FIG. 3 is an enlarged fragmentary view illustrating the construction and operation of the doctor which removes and mixes the partially thickened pulp from the surface of the roll to which the suspension to be thickened is initially delivered.

The thickening apparatus of the invention as shown in FIGS. 1-3 includes a relatively simple frame comprising two columns 10 and 11 on each side connected by side beams 12 and suitable cross braces 13. The two large rolls 20 and 22 which are the major operating elements of this apparatus are mounted at opposite ends of the frame, the roll 22 being shown as mounted by pillow blocks 23 on the tops of the columns 11. This roll 22 is the driven roll, through the belt drive indicated generally at 24 by a motor 25 mounted on the cross brace 13 between the columns 11. Both rolls are shown as of the same diameter, which is not essential, but if rolls of different diameters are used, the roll 20 which receives the suspension first should be the larger.

An endless loop of woven metal or plastic "vwire" 30 is trained around the rolls 20 and 22 and defines therewith a space in which the other operating parts of the apparatus are located. The roll 20 has an adjustable mounting on the frame which provides means for tensioning the wire 30, each of the journals of the roll 20 being mounted by a pillow block 31 on a base 33, shown as an I-beam, which is in turn mounted for sliding movement on the side beam 12. Means such as a pair of jack screws 35 connected between bases 33 and the adjacent columns 10 and 11 cause and control this movement to effect corresponding control of the tension in wire 30. Guiding of the wire may be effected by a strip 36 along one or both edges thereof which fits in a peripheral groove 37 in each of rolls 20 and 22.

A headbox 40 is mounted on the same base members 33 as the roll 20 so that it maintains a fixed spacing with respect to roll 20. This headbox is shown as of an open type including lower and upper walls 41 and 42 which extend upwardly to define a spout through which stock is discharged into the wedge zone 44 defined by the surface of the roll 20 and the upper run of wire 30 approaching the roll. The stock to be thickened is fed to one end of the headbox by any convenient feed line (not shown) from the usual stock supply pump (not shown).

At the other end of the space defined by the upper and lower runs of the wire 30 and the rolls 20 and 22 is a trough 50 having a screw conveyor 51 mounted in the bottom thereof for receiving thickened pulp from the surface of roll 22 in the wedge zone 52 defined by the roll surface and the upper run of wire 30 leaving this roll. The trough 50 includes a doctor 55 extending along its downstream edge which removes the thickened pulp from the surface of roll 22. An inclined wall 56 along the front edge of trough 50 prevents this pulp from being thrown beyond the trough, and the screw 51 forces the accumulated pulp to a chute 57 at the back of the machine which leads to the next station in the system.

In the operation of this apparatus, the pulp suspension to be thickened is constantly supplied to the wedge zone 44 from the headbox 40, and partially dewatered pulp is trapped between the wire 30 and the surface of roll 20. In order to increase the effectiveness of this action, the upper headbox wall 41 may terminate where it is engaged by the wire 30, at a position spaced by a substantial distance from roll 20 as shown in FIG. 1, or may extend only part way to the roll 20, as shown in FIG. 3, so that the stock is discharged directly against the inner surface of the portion of the wire traveling over it. Under these conditions, a substantial volume of water will be forced through the wire before the wire reaches roll 20, thereby effecting initial dewatering of the pulp to facilitate its being trapped between the wire and the surface of roll 20.

Proper control of wire tension also contributes to the effectiveness of the initial dewatering of the suspension in the wedge zone 44 and as the pulp travels therefrom around the surface of roll 20. More specifically, it is desirable that the wire tension not be so high as to make it difficult for the preliminarily thickened suspension to enter the space between the wire and the surface of roll 20. In other words, if the wire tension is comparatively low, the pulp which has been subjected to initial dewatering as it approaches the small end of the wedge zone will more readily be trapped between the wire and roll 20 than if the wire is very tight. For reference purposes on this point, tests indicate that wire tension in the range of 1 to 40 pounds per linear inch is recommended.

With the wire maintained under relatively light tension as described, it will exert some pressure on the trapped pulp moving from the wedge zone 44 into the space between the wire and roll 20, thereby forcing liquid to be expressed therefrom through the interstices in the wire. The primary action of the wire, however, is to serve as a filter medium that holds the fiber on its inner surface against the action of centrifugal force, which is the major factor causing dewatering of the retained pulp. As a result of the restraining or retaining action of the wire on the pulp, it is possible to operate the apparatus of the invention at relatively high speeds, particularly in comparison with conventional deckers, e.g. at wire speeds in the range of 2100-3000 feet per minute using rolls 20 and 22 which are 24 inches in diameter.

The white water expressed in this manner through the wire is thrown into a trough 60 which extends under both rolls 20 and 22 and is provided with a drain outlet 61. A two-piece hood 62 is mounted on the frame above the apparatus as a whole, and it fits into the top of the trough 60 so that any water hitting the inner surface of this hood will drip therefrom into the trough.

As the thickened pulp between the wire and the surface of the roll 20 approaches the wedge zone 65 defined by roll 20 and the lower run of the wire leaving this roll, it will tend to transfer from the wire to the surface of the roll, as a result of the natural tendency of wet pulp to adhere to the smoothest available surface. Therefore, a doctor blade 66 is pivotally mounted at 67 on the base members 33 to extend the full width of this wedge zone 65 in position to remove the pulp 68 from the surface of the roll and redeposit it on the upper surface of the lower wire run. A counterweight 70 projecting from the back edge of blade 66 biases the front edge of the blade against roll 20, and an apron 71 of rubber or like flexible material extends from the back edge of doctor blade 66 to assist in redepositing and smoothing this pulp on the wire. Other forms of doctor than a blade—such as an air doctor—could be used.

This operation will inherently also cause a certain amount of mixing of the pulp, which will therefore present a different face to the wire as it travels thereon to the roll 22, where the same combined actions of centrifugal force and wire tension will cause further expression of water through the wire. The resulting thickened pulp reaches the wedge zone 52 between the surface of roll 22 and the upper run of the wire, and this pulp will initially transfer from the wire to the roll surface, from which it is removed by the doctor 55 into the trough 50. A shower assembly 75 carried by the frame or the hood 62 washes any remaining pulp from the upper run of the wire and down onto the lower run traveling to the roll 22.

The operating capacity of thickening apparatus in accordance with the present invention provides a dramatic contrast with conventional deckers, starting with the fact that at the most, a decker is limited to increasing the consistency of feed stock at 1.5% solids to a maximum of approximately 4.5% solids. Further, a decker wherein the mold has a diameter of thirty-six inches, which is a conventional size, can handle only 0.5 tons per day for each inch of face, so that to handle 70 tons per day, the mold must be approximately twelve feet in length while the vat in which it operates is correspondingly longer.

In contrast, in thickening apparatus in accordance with the invention wherein the rolls 20 and 22 are twenty-four inches in diameter and have their axes six feet apart, only fifteen inches of width is required to handle 70 tons per day at a feed consistency of 1.5% solids, and this apparatus will increase that consistency to between 9% and 12% solids. This astonishing increase in capacity—particularly in combination with the contrast in face width of the rolls—is materially contributed to by the much higher speed at which the apparatus of the invention will operate, namely speeds in the range of 1500-3000 feet per minute, whereas deckers are limited to a linear speed in the range of 200-300 feet per minute.

Not only does this greatly increased speed contribute to the higher capacity of the apparatus of the invention in contrast to conventional deckers, but where a decker must operate at slow speed to minimize the effective centrifugal force on the pulp material on the surface of the cylinder mold, the substantially higher rotational speeds of the rolls as used in the present invention result in highly effective use of centrifugal force for expression of liquid through the wire. In addition, the apparatus of the invention is significantly simpler in construction than a decker, requiring only smooth-surfaced rolls and a short wire loop in contrast to the relatively complex wire-covered structure of the cylinder mold which is the operating member of a decker.

Figures 4, 5:
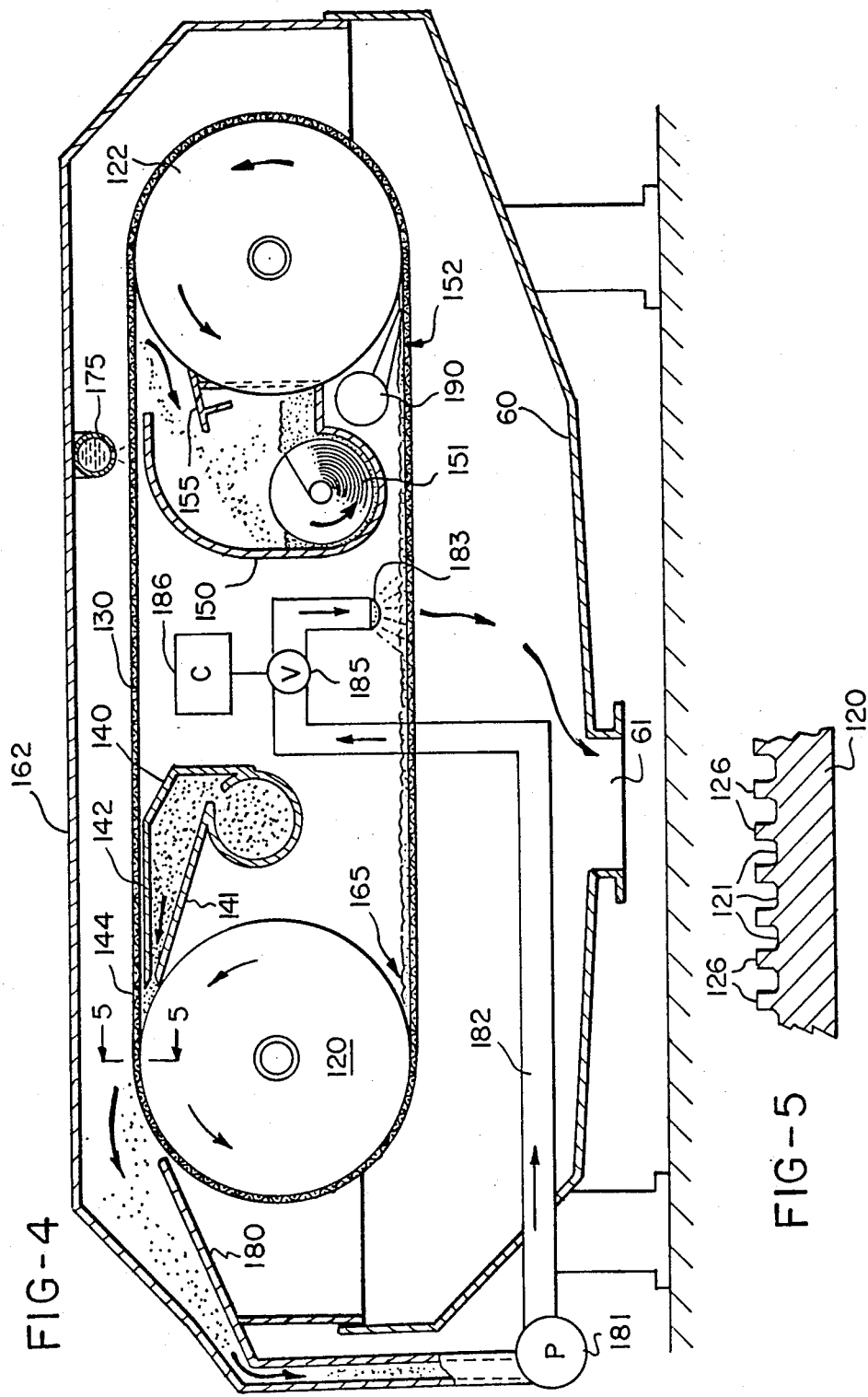
FIG. 4 is a view similar to FIG. 1 showing thickening apparatus in accordance with modifications of the invention.
FIG. 5 is an enlarged fragmentary section on the line 5—5 in FIG. 4.

The thickening apparatus shown in FIGS. 4-5 incorporates a number of alternative additional features of the invention, and in these views, the same reference characters are used as in FIGS. 1-3 with 100 added thereto. One of these features involves the use of rolls 120 and 122 which have surface indentations wherein the pulp can be received while it is restrained against centrifugal discharge by the wire 130.

More specifically, as shown in FIG. 5, the roll 120 is provided with axially spaced circumferential grooves 121 separated by circumferential lands 126 on which the wire 130 is supported. As an example of dimensions which have been found satisfactory with a roll 120 having an outer diameter of 24 inches, the grooves 121 may be 0.187 inch in depth and 0.250 inch in width, while the lands 126 are 0.125 inch in width.

This arrangement of relatively wide grooves and narrow lands greatly increases the space wherein pulp can be retained by the portion of the wire 130 wrapping roll 120, without interfering with or otherwise affecting the centrifugal dewatering action described above in connection with FIG. 1. The same groove construction can also be provided for the roll 122, and blind indentations of other shapes can be used, such as multiple drilled holes, so long as the rolls remains impervious to liquid beyond the bottoms of any surface indentations therein.

The headbox 140 shown in FIG. 4 is of somewhat different construction from the headbox 40 in FIGS. 1 and 3, particularly in that its upper wall 142 is spaced below the upper run of the wire 130 and projects with the lower wall 141 most of the way into the wedge zone 144 defined by the wire 130 and roll 120 so that the stock to be thickened is delivered directly into the apex of this wedge zone rather than against the wire as in FIGS. 1 and 3. This headbox construction and arrangement have been found particularly applicable to embodiments of the invention provided with grooved or otherwise surface indented rolls to assure that such surface indentations are filled with stock at the earliest possible instant.

Another feature of the invention illustrated in FIG. 4 relates to the handling of expressed white water which is rich in fines, as discussed above in the Summary of the Invention. More specifically, a save-all pan or shelf 180 is mounted at the end of hood 162 at the appropriate level to intercept the white water discharged through the wire as it travels through the first portion of its wrapping relation with roll 120, e.g. 45°-50°. This fines-rich fraction of the white water is recirculated by a pump 181 and line 182 to a shower pipe 183 or other distributing means located above the bottom run of the wire 130 as it travels from roll 120 to roll 122.

A valve 185 is adjustable to determine how much of the white water from pump 181 is supplied to the thickener and how much is transmitted to other white water collection means. This valve may be operated manually as determined by inspection of the operating conditions of the apparatus, but preferably it would be provided with some type of automatic control responsive to a condition such as the brightness of the discharge pulp or the consistency of the white water. For example, in the use of the apparatus of the invention in a deinking system, this valve could be adjusted automatically to maintain the brightness of the thickened pulp at a constant value.

The selection and installation of such an automatic control is within the skill of the art, and such control is accordingly indicated diagrammatically at 186 in FIG. 4. It should also be noted that the spray pipe or other discharge means for fines-rich white water within the loop of wire 130 is subject to substantial variation, and specifically that the white water could be added by way of a spray system located to wash down whatever pulp build-ups might occur within the loop of the wire.

It is also possible in accordance with the invention to supply stock to be thickened to the interior of the wire loop just ahead of the roll 122 as well as at the roll 120. Thus as shown in FIG. 4, a headbox 190 like the headbox 140 can be installed in the wedge zone 152 defined by the roll 122 and the approaching lower run of the wire 130. With this arrangement, whether or not fines-rich white water is added as already described, the second supply of stock will be laid on top of the mat of partially thickened pulp traveling on the lower run of the wire, and this mat will have a filtering and retaining action on the fines deposited thereon. As previously noted, the secondary headbox 190 can be used and operated with or without the addition of fines-rich white water at the spray pipe 183.

When a secondary headbox 190 is used, it is desirable that the mat of pulp on the lower run of the wire be as smooth as possible. This result is readily obtained by the use of a grooved roll 120, because the doctor 66 of FIG. 1 is no longer needed, by reason of the fact that since the surface of the wire is then smoother than that of the roll, the pulp mat will remain as a smooth layer on the wire rather than transferring to the roll surface is in FIG. 1. In addition, the shower pipe 183, or a supplemental shower pipe, can be located in or near the wedge zone 165 to spray white water against the surface of roll 122 as it rises from the wire 130 to flush fiber therefrom down onto the pulp mat on the wire.

Since the thickening apparatus of the invention was developed for use in the treatment of paper making pulp suspensions, it has been described with specific reference thereto. It is to be understood, however, that the apparatus of the invention could be used to thicken other dilute liquid suspensions of pulp materials, such for example as sludges and the like.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. Apparatus for thickening a suspension of pulp material in water, comprising:
   (a) means defining a frame,
   (b) first and second liquid-impervious rolls rotatably mounted on substantially horizontal axes in spaced relation in said frame,
   (c) an endless wire trained around said rolls in wrapping relation with a substantial portion of the surface thereof and cooperating therewith to define a space bounded by said rolls and opposed upper and lower runs of said wire,
   (d) headbox means mounted on said frame in said space and including an outlet for the pulp suspension to be thickened,
   (e) said headbox means being so positioned that said outlet discharges the pulp suspension into a wedge zone defined by said first roll and the portion of said wire approaching said first roll,
   (f) means for driving one of said rolls to cause said wire to travel around said rolls at a speed effecting the development of centrifugal force causing liquid to be expressed through the portion of said wire wrapping each of said rolls and thereby to thicken the pulp carried on the inner surface of said wire, and
   (g) means mounted on said frame in said space between said headbox means and said second roll in position to collect the resulting thickened pulp from the surface of said second roll.

2. Thickening apparatus as defined in claim 1 wherein said wire travels from each of said rolls directly to the other said roll and wraps substantially 180° of the surface of each said roll.

3. Thickening apparatus as defined in claim 1 wherein said rolls are located in substantially the same horizontal plane.

4. Thickening apparatus as defined in claim 1 further comprising doctor means located adjacent the wedge zone defined by said first roll and the portion of said wire leaving said roll for removing pulp from the surface of said first roll and redepositing such removed pulp on the inner surface of said wire for travel thereon to said second roll.

5. Thickening apparatus as defined in claim 4 wherein said doctor means comprises a blade mounted in said frame with the forward edge thereof engaging said first roll, and an apron of flexible material extending from the rearward edge of said blade to overlie pulp removed from the surface of said roll by said blade and thereby to redeposit such removed pulp on said wire.

6. Thickening apparatus as defined in claim 1 further comprising means mounting said first roll for movement on said frame toward and away from said second roll to effect tensioning of said wire.

7. Thickening apparatus as defined in claim 6 wherein said headbox means is mounted on the same movably mounted means as said first roll to maintain a fixed relation thereof with said first roll.

8. Thickening apparatus as defined in claim 1 wherein said headbox outlet comprises an upper wall which terminates where it engages said wire at a position spaced by a substantial distance upstream from said first roll, said position being such that the pulp suspension is delivered directly to the inner surface of said wire in advance of said first roll to promote partial dewatering of the suspension upwardly through said wire prior to the trapping of pulp between said wire and first roll.

9. Thickening apparatus as defined in claim 1 wherein said headbox outlet comprises upper and lower walls which converge into the wedge zone defined by the surface of said first roll and the portion of said wire approaching said roll and which direct the pulp suspension into the apex of said wedge zone.

10. Thickening apparatus as defined in claim 9 wherein said doctor means comprises a blade mounted on the same movably mounted means as said first roll with the forward edge thereof engaging said first roll, and an apron of flexible material extending from the rearward edge of said blade to overlie pulp removed from the surface of said roll by said blade and thereby to redeposit such removed pulp on said wire.

11. Thickening apparatus as defined in claim 1 wherein at least said first roll has indentations in the surface thereof wherein the pulp suspension is received and retained by said wire and from which said retained pulp is discharged by centrifugal force upon separation of said wire from said roll surface.

12. Thickening apparatus as defined in claim 1 wherein both of said rolls have indentations in the surfaces thereof wherein the pulp suspension is received and retained by said wire and from which said retained pulp is discharged by centrifugal force upon separation of said wire from said roll surfaces.

13. Thickening apparatus as defined in claim 11 wherein said surface indentations comprise circumferentially arranged grooves in said roll surface separated by circumferential land portions of said roll surface.

14. Thickening apparatus as defined in claim 1 further comprising means for intercepting the liquid expressed through said wire from only an upper portion of said first roll, and means for recirculating said liquid to said space between said wire runs and for discharging said liquid on the pulp traveling on the lower run of said wire from said first roll to said second roll.

15. Thickening apparaus as defined in claim 1 further comprising secondary headbox means mounted on said frame adjacent the wedge zone defined by said second roll and the portion of the lower run of said wire approaching said second roll, said headbox means including an outlet for discharging pulp suspension into said wedge zone on top of the layer of pulp entering said wedge zone on the bottom run of said wire.

16. Apparatus for thickening a suspension of pulp material in water, comprising:
   (a) means defining a frame,
   (b) first and second liquid-impervious rolls rotatably mounted in said frame on horizontal axes in spaced relation in substantially the same horizontal plane,
   (c) an endless wire trained around said rolls in wrapping relation with substantially 180° of the surface of each said roll and cooperating therewith to define a space bounded by said rolls and opposed upper and lower runs of said wire,
   (d) headbox means mounted on said frame in said space and including an outlet for the pulp suspension to be thickened which is inside said wire and directed into a wedge zone defined by said first roll and the portion of said upper wire run approaching said first roll whereby said pulp suspension is trapped between said wire and the portion of said first roll wrapped thereby,
   (e) means for driving one of said rolls to cause said upper wire run to travel toward said first roll and said lower wire run to travel toward said second roll at a speed effecting the development of centrifugal force causing liquid to be expressed through the portion of said wire wrapping each of said rolls and thereby to thicken the pulp carried on the inner surface of said wire, and
   (f) means mounted on said frame in said space between said headbox means and said second roll in position to collect the resulting thickened pulp from the surface of said second roll.

17. Thickening apparatus as defined in claim 16 wherein at least said first roll has indentations in the surface thereof wherein the pulp suspension is received and retained by said wire and from which said retained pulp is discharged by centrifugal force upon separation of said wire from said roll surface.

18. Thickening apparatus as defined in claim 16 wherein said surface indentations comprise circumferentially arranged grooves in said roll surface separated by circumferential land portions of said roll surface.

19. Thickening apparatus as defined in claim 16 further comprising means for intercepting the liquid expressed through said wire from only an upper portion of said first roll, and means for recirculating said liquid to said space between said wire runs and for discharging said liquid on the pulp traveling on the lower run of said wire from said first roll to said second roll.

20. Thickening apparatus as defined in claim 16 further comprising secondary headbox means mounted on said frame adjacent the wedge zone defined by said second roll and the portion of the bottom run of said wire approaching said second roll, said headbox means including an outlet for discharging pulp suspension into said wedge zone on top of the layer of pulp entering said wedge zone on the bottom run of said wire.

* * * * *